US012304374B2

(12) United States Patent
Mansouri et al.

(10) Patent No.: US 12,304,374 B2
(45) Date of Patent: May 20, 2025

(54) TRAY TABLE WITH AMENITIES FOR A PASSENGER SEAT

(71) Applicant: Safran Seats USA LLC, Gainesville, TX (US)

(72) Inventors: Reza Mansouri, Santa Fe Springs, CA (US); Charles Michael Parker, Irvine, CA (US); Romain Tranier, Costa Mesa, CA (US); Amen Omoragbon, Westminster, CA (US); Anthony Tran, Huntington Beach, CA (US); Gokul Ramarathnam, Irvine, CA (US); Igor Chak, Los Angeles, CA (US)

(73) Assignee: Safran Seats USA LLC, Gainesville, TX (US)

( * ) Notice: Subject to any disclaimer, the term of this patent is extended or adjusted under 35 U.S.C. 154(b) by 153 days.

(21) Appl. No.: 18/029,644

(22) PCT Filed: Oct. 21, 2020

(86) PCT No.: PCT/US2020/056668
§ 371 (c)(1),
(2) Date: Mar. 30, 2023

(87) PCT Pub. No.: WO2022/086523
PCT Pub. Date: Apr. 28, 2022

(65) Prior Publication Data
US 2023/0365042 A1 Nov. 16, 2023

(51) Int. Cl.
*B60N 3/00* (2006.01)
*B64D 11/00* (2006.01)
*B64D 11/06* (2006.01)

(52) U.S. Cl.
CPC .......... *B60N 3/004* (2013.01); *B64D 11/0638* (2014.12)

(58) Field of Classification Search
CPC ............................ B60N 3/004; B64D 11/0638
See application file for complete search history.

(56) References Cited

U.S. PATENT DOCUMENTS 3,596,987 A * 8/1971 Wilson ............... B64D 11/0007
297/163
5,082,116 A * 1/1992 Schanne ................... A63F 1/00
273/148 A (Continued)

FOREIGN PATENT DOCUMENTS

EP      3042852 A1    7/2016
WO   2007123615 A1   11/2007

(Continued)

OTHER PUBLICATIONS

International Patent Application No. PCT/US2020/056668, International Search Report and Written Opinion, dated Jun. 18, 2021.

(Continued)

*Primary Examiner* — Rodney B White
(74) *Attorney, Agent, or Firm* — Kilpatrick Townsend & Stockton LLP

(57) ABSTRACT

Described are tray tables for passenger seats having a first surface, a second surface opposite from the first surface, and at least one of a pocket, a control panel, or a table support. The pocket may be defined in one of the surfaces of a tray table and have a pocket surface that is recessed in the tray table relative to the second surface. The control panel may be embedded in one of the surfaces of a tray table and may control at least one piece of cabin equipment associated with a passenger seat having the tray table. The table support may be connected between opposing sides of a tray table to pivotably support the tray table on a seat back of a passenger seat having the tray table.

20 Claims, 3 Drawing Sheets

(56) References Cited

U.S. PATENT DOCUMENTS

| | | | |
|---|---|---|---|
| 6,860,550 B2* | 3/2005 | Wojcik | B60N 3/004 |
| | | | 297/163 X |
| 8,540,309 B2* | 9/2013 | Berger | B64D 11/00153 |
| | | | 297/188.04 X |
| 9,016,627 B2* | 4/2015 | Margis | B64D 11/0015 |
| | | | 244/118.6 |
| 9,573,687 B2* | 2/2017 | Stephens | B64D 11/0638 |
| 9,610,879 B2* | 4/2017 | Zheng | B60R 11/00 |
| 9,919,802 B2* | 3/2018 | Stephens | B64D 11/00151 |
| 10,011,357 B2* | 7/2018 | Margis | B60R 11/0229 |
| 10,556,684 B2* | 2/2020 | Margis | G06F 1/18 |
| 2002/0066393 A1* | 6/2002 | Strode | G09F 21/04 |
| | | | 108/50.11 |
| 2003/0233659 A1* | 12/2003 | Guerin | B60N 3/004 |
| | | | 725/77 |
| 2006/0075934 A1* | 4/2006 | Ram | B64D 11/0015 |
| | | | 108/44 |
| 2014/0167457 A1 | 6/2014 | Schultheis | |
| 2024/0336361 A1* | 10/2024 | Prathipati | B64D 11/0627 |

FOREIGN PATENT DOCUMENTS

| | | |
|---|---|---|
| WO | 2013055671 A1 | 4/2013 |
| WO | 2014075040 A1 | 5/2014 |

OTHER PUBLICATIONS

European Application No. 20804738.1, Office Action mailed on Nov. 19, 2024, 4 pages.

\* cited by examiner

TRAY TABLE WITH AMENITIES FOR A PASSENGER SEAT

FIELD OF THE INVENTION

The field of the invention relates to passenger seats, and, more particularly, to tray tables for passenger seats.

BACKGROUND

Passenger vehicles, such as aircraft, buses, trains, ships, and automobiles, include passenger seats in which passengers can be seated and otherwise use during travel. Traditionally, the living space for each passenger seat has offered passengers a limited ability to control and utilize their living space during travel, and the limited control and ability to utilize the living space may negatively affect the passenger's travel experience. As such, there is still a need for passenger seats that allow for a passenger to have improved control and ability to user their living space during travel.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table for a passenger seat includes a first surface, a second surface opposite from the first surface, and a pocket defined in the second surface. The pocket includes a pocket surface, and in various embodiments, the pocket surface is recessed in the tray table relative to the second surface.

In some embodiments, a distance between the pocket surface and the first surface is less than a distance between the second surface and the first surface. In various embodiments, the pocket includes a pocket cover extending over the pocket surface. The pocket surface and the pocket cover together define a pocket cavity, and the pocket cover may define an opening providing access to the pocket cavity.

In certain embodiments, the tray table also includes a first side extending between the first surface and the second surface and a second side opposite from the first side and extending between the first surface and the second surface. In a deployed position, the first side and the second side may extend in a forward and aft direction. In some cases, the tray table includes a table support configured to pivotably support the tray table on a seat back, and the table support may be connected to the tray table between the first side and the second side.

In various embodiments, the tray table includes a control panel embedded in the second surface. The control panel may include a user interface and may be configured to control at least one piece of cabin equipment associated with a passenger seat comprising the tray table. In some cases, the pocket is a first pocket and the pocket surface is a first pocket surface, and the tray table includes a second pocket defined in the second surface. The second pocket may include a second pocket surface that is recessed relative to the second surface, and the control panel may be between the first pocket and the second pocket.

In some embodiments, the tray table is configured to move between a stowed position and a deployed position relative to a seat back, and, in the deployed position, the second surface is downward facing and the first surface is upward facing.

According to certain embodiments of the present invention, a tray table for a passenger seat includes a first surface, a second surface opposite from the first surface, and a control panel embedded in the second surface. The control panel includes a user interface and is configured to control at least one piece of cabin equipment associated with a passenger seat comprising the tray table.

In some embodiments, a pocket is defined in the second surface. The pocket may include a pocket surface that is recessed in the tray table relative to the second surface. In certain cases, the pocket is a first pocket and the pocket surface is a first pocket surface, and the tray table includes a second pocket defined in the second surface and having a second pocket surface that is recessed relative to the second surface. In some cases, the control panel is between the first pocket and the second pocket.

In various embodiments, the control panel includes a touch screen. In various aspects, the at least one piece of cabin equipment includes at least one of a cabin light associated with the tray table or an air vent associated with the tray table.

The tray table may also include a first side extending between the first surface and the second surface, a second side opposite from the first side and extending between the first surface and the second surface, and a table support configured to pivotably support the tray table on a seat back. In various embodiments, in a deployed position, the first side and the second side extend in a forward and aft direction. The table support may be connected to the tray table between the first side and the second side, and the tray table may be configured to move between a stowed position and a deployed position relative to the seat back. In some cases, in the deployed position, the second surface is downward facing and the first surface is upward facing.

According to certain embodiments of the present invention, a tray table for a passenger seat includes a first side, a second side opposite from the first side, and a table support configured to pivotably support the tray table on a seat back of a passenger seat comprising the tray table. In various embodiments, the table support is connected to the tray table between the first side and the second side.

In some embodiments, the tray table is configured to support the tray table such that the tray table is slidable relative to the seat back. In certain embodiments, the tray table also includes a first surface extending between the first side and the second side, and a second surface opposite from the first surface and extending between the first side and the second side. In some cases, in a deployed position, the second surface is downward facing and the first surface is upward facing. A pocket may be defined in the second surface and include a pocket surface that is recessed in the tray table relative to the second surface. In some cases, the pocket is a first pocket and the pocket surface is a first pocket surface, and the tray table includes a second pocket defined in the second surface and a control panel embedded in the second surface between the first pocket and the second pocket.

In various embodiments, the tray table includes a first surface extending between the first side and the second side, a second surface opposite from the first surface and extending between the first side and the second side, and an aft side extending between the first side and the second side and between the first surface and the second surface. In certain cases, the table support is connected to the aft side of the tray table.

In certain embodiments, the tray table includes a central axis between the first side and the second side, in a deployed position, the central axis extends in a forward and aft direction, and the table support is aligned with the central axis. In some embodiments, the tray table is configured to move between a stowed position and a deployed position relative to the seat back, and, in the deployed position, the first side and the second side extend in a forward and aft direction.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing.

The described embodiments of the invention provide tray tables for passenger seats. While the tray tables are discussed for use with aircraft seats, they are by no means so limited. Rather, embodiments of the tray tables may be used in passenger seats or other seats of any type or otherwise as desired, or may be used with other structures other than seats as desired, including but not limited to a console, wall, support structure, etc.

Figure 1:
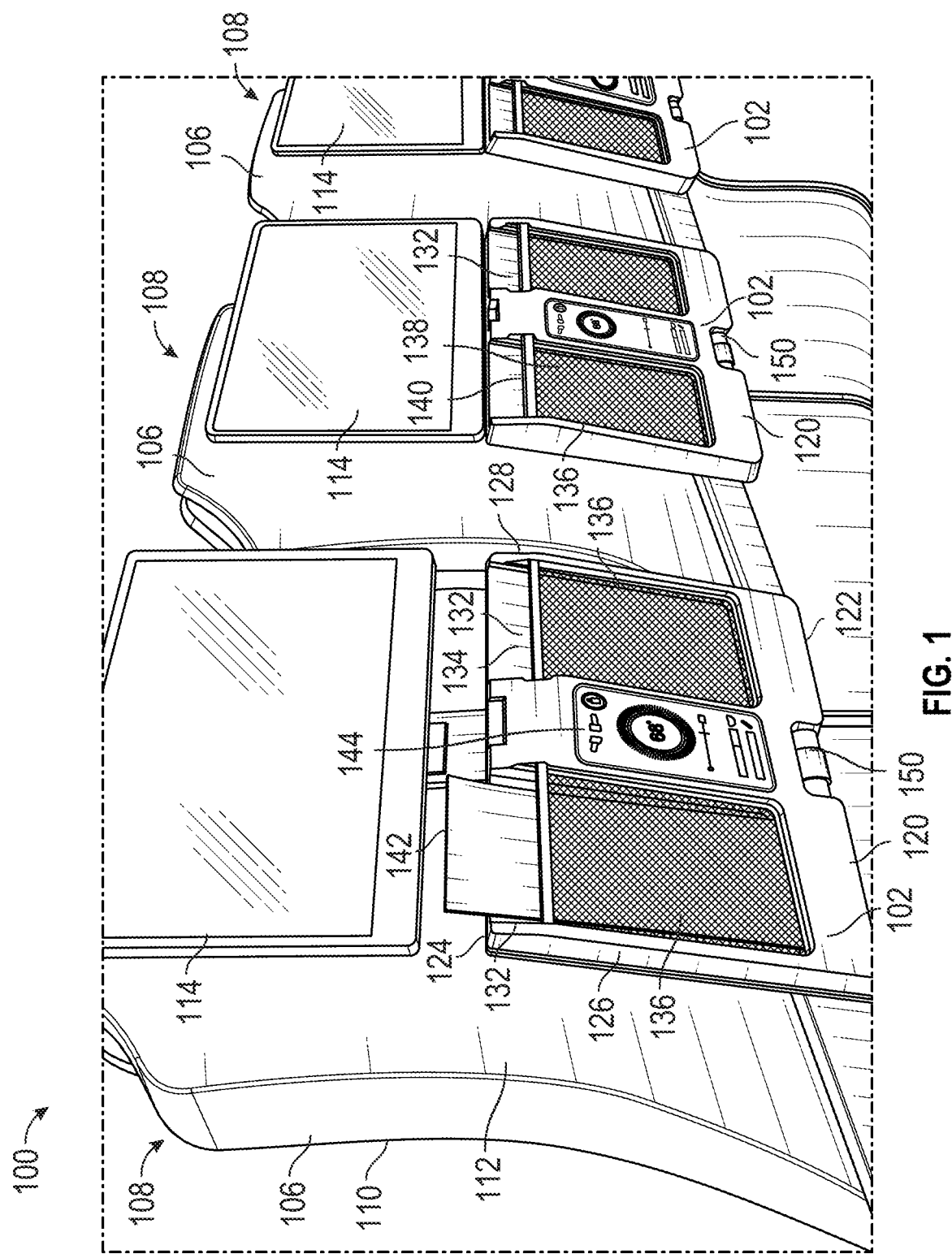
FIG. 1 is a perspective view of a portion of a passenger seat with a tray table according to certain embodiments of the present invention.
Figure 2:
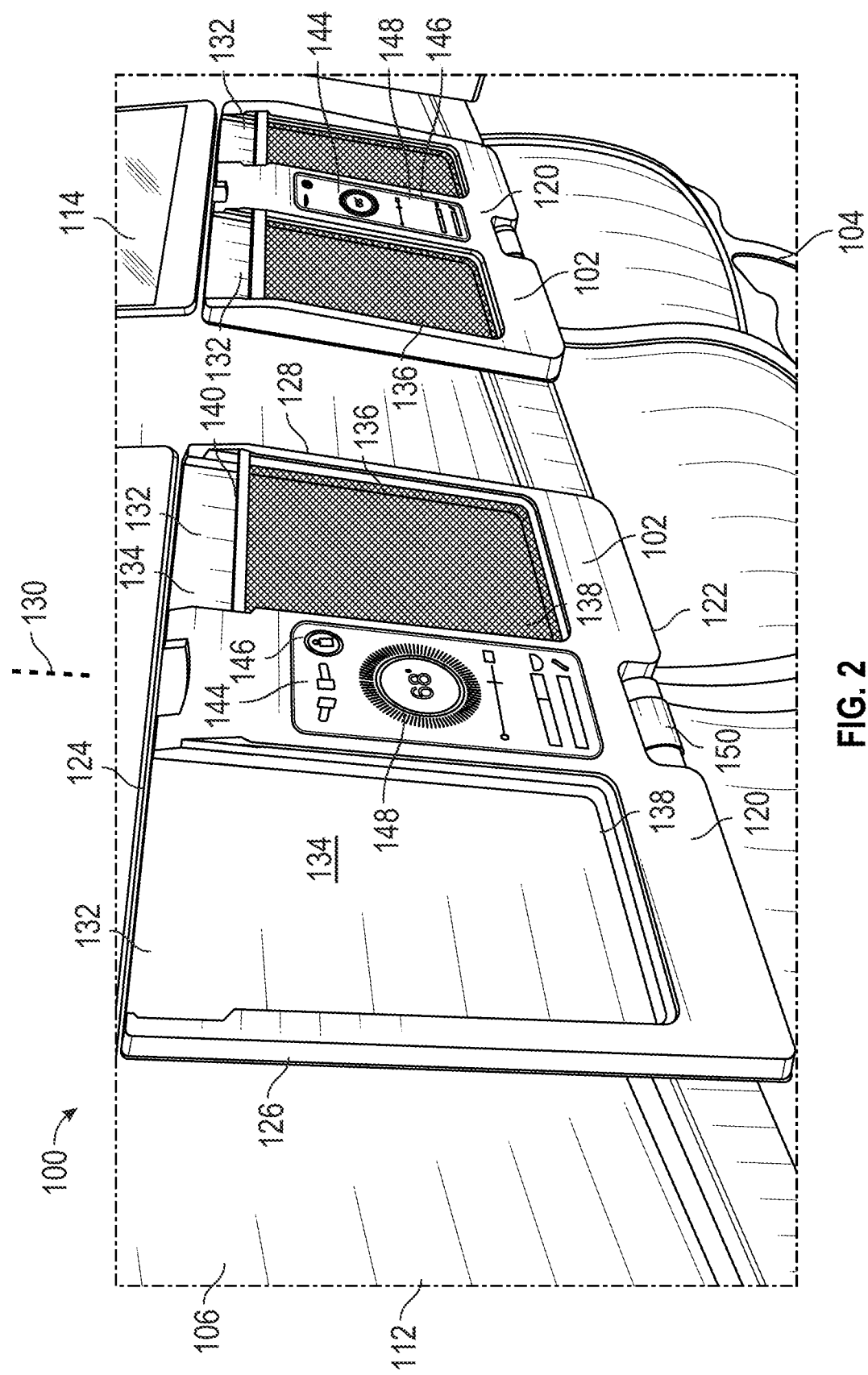
FIG. 2 is another perspective view of the passenger seat and tray table of FIG. 1.
Figure 3:
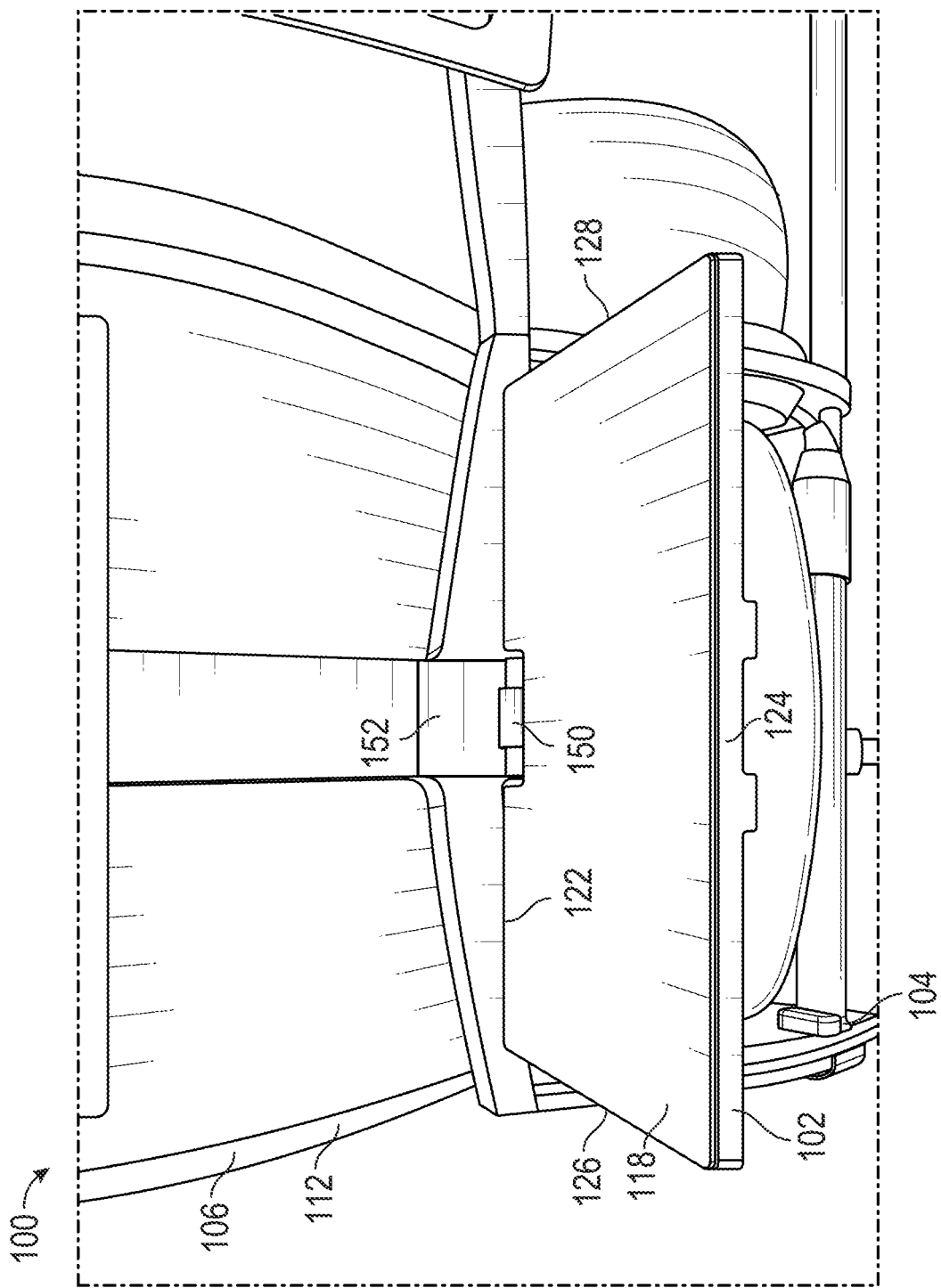
FIG. 3 is another perspective view of the passenger seat and tray table of FIG. 1.

According to certain embodiments of the present invention, as shown in FIGS. 1-3, a passenger seat assembly 100 includes at least one tray table 102. Any desired number of tray tables 102 may be provided with the passenger seat assembly 100 as desired. As discussed in detail below, the tray tables 102 may be attached and supported at various locations on the passenger seat assembly 100 may be utilized to improve control and utilization of a living space for a passenger.

In general, the passenger seat assembly 100 includes a seat base 104 and at least one seat back 106 that is supported relative to the seat base 104. The number of seat backs 106 should not be considered limiting on the current disclosure. In various examples, the number of seat backs 106 corresponds with the number of passenger seats that the passenger seat assembly is capable of carrying, and each seat back 106 and the corresponding portion of the seat base 104 define a particular passenger seat 108. In the example of FIGS. 1-3, the passenger seat assembly 100 is capable of carrying three passengers and accordingly has three seat backs 106 and three passenger seats 108. However, in other examples, the passenger seat assembly 100 may be capable of carrying any desired number of passengers, such as one passenger, two passengers, four passengers, or any other desired number of passengers. In these examples, the passenger seat assembly 100 can likewise have any desired number of corresponding seat backs 106 and passenger seats 108.

Each seat back 106 and the corresponding portion of the seat base 104 together at least partially define a living space for the passenger when used (i.e., the space that the passenger may occupy and use while sitting in a particular passenger seat). In some cases, a seat back 106 may be pivotable relative to the seat base 104, although it need not be in other examples. Each seat back 106 includes a forward side 110 and an aft side 112. In certain aspects, the aft side 112 may at least partially define the living space for a passenger in a passenger seat 108 that is aft of the particular seat back 106. As illustrated in FIGS. 1-3, in various embodiments, an in-flight entertainment monitor 114 and literature pocket may optionally be supported on the seat back 106.

Each tray table 102 may be formed of materials including but not limited to aluminum, stainless steel, aramid fibers, polycarbonate, polypropylene, other metallic materials, composite materials, or other similar or suitable materials as desired. As illustrated in FIGS. 1-3, each tray table 102 includes a first surface 118 and a second surface 120 opposite from the first surface 118. The tray table 102 is movable between a stowed position (FIGS. 1 and 2) and a deployed position (FIG. 3). In various embodiments, in the stowed position, one of the surfaces 118, 120 may generally face the seat back 106 and the other surface may face away from the seat back 106 (e.g., face an aft passenger seat 108 relative to the seat back 106), and in the deployed position, one of the surfaces 118, 120 may be upward-facing and the other surface may be downward-facing. In the embodiment of FIGS. 1-3, in the stowed position, the first surface 118 faces the seat back 106 and the second surface 120 faces away from the seat back 106, and in deployed position, the first surface 118 is upward-facing and the second surface 120 is downward facing. In other embodiments, the orientation of the surfaces 118, 120 in the stowed and deployed positions may be switched, or the tray table 102 may be adjustable such that the surfaces 118, 120 may be in any orientation as desired when the tray table 102 is in the stowed and deployed positions.

In some embodiments, each tray table 102 may include a forward side 122 and an aft side 124, each extending between the first surface 118 and the second surface 120. In various embodiments, the aft side 124 may be the side of the tray table 102 furthest from the seat back 106 when the tray table 102 is in the deployed position, and the forward side 122 may be the side of the tray table 102 closes to the seat back 106 when the tray table 102 is in the deployed position. Each tray table 102 may also include a first side 126 and a second side 128, each of which extends between the first surface 118 and the second surface 120 and between the forward side 122 and the aft side 124. In the deployed position, the first side 126 and the second side 128 may each extend in a forward and aft direction. A central axis 130 (see FIG. 2) may extend is a direction from the forward side 122 to the aft side 124 and between the first side 126 and the second side 128. In other embodiments, the tray table(s) 102 may have various shapes as desired, and the shape of the tray tables 102 illustrated in FIGS. 1-3 with the sides 122, 124, 126, and 128 should not be considered limiting on the disclosure. As one non-limiting example, one of the tray tables 102 may be a triangular shape or an ovoid shape. Moreover, it will be appreciated that in a passenger seat assembly 100 with a plurality of tray tables 102, the shape of one tray table 102 need not be the same as the shape of another tray table 102.

As best illustrated in FIGS. 1 and 2, in various embodiments, at least one tray table 102 includes a pocket 132 that is defined in the second surface 120. In certain embodiments, the tray table 102 may have a plurality of pockets 132, and the number of pockets 132 should not be considered limiting on the disclosure. In the embodiment of FIGS. 1 and 2, each tray table 102 includes two pockets 132.

Each pocket 132 includes a pocket surface 134 that is recessed into the tray table 102 relative to the second surface 120 such that a distance between the pocket surface 134 and the first surface 118 is less than a distance between the second surface 120 and the first surface 118. Each pocket 132 may include a pocket cover 136 that extends over at least a portion of the pocket surface 134, and the pocket cover 136 and the pocket surface 134 together define a pocket cavity 138. The pocket cover 136 and the pocket surface 134 may also define a pocket opening 140 providing access to the pocket cavity 138 such that a passenger may place an item to be stowed 142 (e.g., phone, book, airline material, gear for passengers, etc.) within the pocket 132.

In some embodiments, the pocket cover 136 may be integrally or monolithically formed with the tray table 102. In other embodiments, the pocket cover 136 may be removably attached to the tray table 102 via various suitable mechanical or chemical mechanisms such that the pocket cover 136 can be selectively removed from the tray table 102 as desired. The pocket cover 136 may be formed from various suitable materials as desired. In some embodiments, the pocket cover 136 may be constructed from a material similar to that of the tray table 102. In other embodiments, the pocket cover 136 may be constructed from other materials as desired. The pocket cover 136 may be solid or may include one or more perforations as desired. In the embodiment of FIGS. 1 and 2, the pocket cover 136 is a flexible mesh and includes a rigid support. However, as mentioned, the type of pocket cover 136 should not be considered limiting on the disclosure. Moreover, the shape of the pocket 132 should not be considered limiting on the current disclosure as the pockets 132 may have various shapes as desired. It will be appreciated that for tray tables 102 with a plurality of pockets 132, the shape of one pocket 132 need not be the same as the shape of another pocket 132.

In some embodiments, and as best illustrated in FIGS. 1 and 2, at least one tray table 102 may include a control panel 144 supported on one of the surfaces 118, 120 of the tray table 102. The control panel 144 may be provided in conjunction with or independently from the pocket(s) 132. In the embodiment of FIGS. 1-3, the control panel 144 is provided in the second surface 120. The control panel 144 includes a panel surface 146 that includes a user interface 148. In some cases, the panel surface 146 is a touch screen such that a passenger can interact with the user interface 148. In other embodiments, the panel surface 146 need not be a touch screen, and various other types of user interfaces 148 may be utilized. In some cases, the control panel 144 is supported in the second surface 120 such that the panel surface 146 is flush with the second surface 120, although in other embodiments the panel surface 146 may be recessed relative to the second surface 120 or be positioned outwards from the tray table 102 relative to the second surface 120. In some embodiments, the control panel 144 may be integrally formed with the tray table 102 (i.e., it cannot be removed without damaging the tray table 102), while in other embodiments the control panel 144 may be removably supported on the tray table 102 via various suitable mechanical or chemical mechanisms as desired.

In the embodiment of FIGS. 1-3, the control panel 144 is provided between two pockets 132 and substantially aligned with the central axis 130 of the tray table 102. However, the particular location of the control panel 144 on the second surface 120 and/or relative to other features of the tray table 102 should not be considered limiting on the disclosure, and the control panel 144 may be provided at various locations as desired. As one non-limiting example, the control panel 144 may be provided in the second surface 120 offset from the central axis 130 and towards the first side 126 of the tray table 102.

The control panel 144 may be communicatively coupled with various pieces of cabin equipment as desired such that a passenger may use the control panel 144 to control one or more pieces of cabin equipment as desired. Cabin equipment that may be controlled by the control panel 144 may include, but is not limited to, the in-flight entertainment monitor 114, a cabin light associated with the tray table 102, and/or an air vent associated with the tray table 102. The control panel 144 embedded into the tray table 102 may allow for improved control of the cabin equipment that is within easier reach of the passenger. As some non-limiting examples, the control panel 144 in the tray table 102 may allow for improved accessibility to control light intensity, airflow, etc. without having to intrude on the living space of another passenger. The control panel 144 may also provide an improved interface to clean and disinfect as part of the table cleaning process compared to traditional controls for cabin equipment.

In some embodiments, and as illustrated in FIGS. 1-3, the tray table 102 may include a table support 150 independently from or in conjunction with the pocket(s) 132 and/or the control panel 144. The table support 150 pivotably supports the tray table 102 on the seat back 106 such that the tray table 102 is movable between the stowed position and the deployed position. In some embodiments, the table support 150 may also support the tray table 102 relative to the seat back 106 such that the tray table 102 is slidable (e.g., towards or away from) the seat back 106. In various embodiments, the table support 150 may be attached to a support column 152 and/or other shell component of the seat back 106, although it need not be in other embodiments.

As best illustrated in FIG. 3, in certain embodiments, the table support 150 is connected to the tray table 102 between the first side 126 and the second side 128. In some embodiments, the table support 150 is connected to the aft side 112 of the tray table 102, although it need not be in other embodiments. In various embodiments, the table support 150 may be connected to the tray table 102 such that the table support 150 is substantially aligned with the central axis 130. In other embodiments, the table support 150 need not be aligned with the central axis 130, and the table support 150 may be connected to the tray table 102 at various other locations between the first side 126 and the second side 128. In certain cases, the table support 150 connected to the tray table 102 between the first side 126 and the second side 128 may free up volume occupied by the tray table 102, thereby allowing for new features and/or increasing the living space for the passenger.

It will be appreciated that tray tables 102 according to the disclosure need not include each of the pockets 132, the control panel 144, and the table support 150, and a tray table may include a single one or sub-combination of such features as desired, and may include additional features as desired. As a non-limiting example, a tray table 102 may include a single pocket 132 but may not include the control panel 144 or the table support 150. As another non-limiting example, a tray table 102 may include the table support 150 and the control panel 144 but may not include a pocket 132.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Example 1. A tray table for a passenger seat, the tray table comprising: a first surface; a second surface opposite from the first surface; and a pocket defined in the second surface and comprising a pocket surface, wherein the pocket surface is recessed in the tray table relative to the second surface.

Example 2. The tray table of any of the preceding or subsequent examples or combination of examples, wherein a distance between the pocket surface and the first surface is less than a distance between the second surface and the first surface.

Example 3. The tray table of any of the preceding or subsequent examples or combination of examples, wherein the pocket further comprises a pocket cover extending over the pocket surface, wherein the pocket surface and the pocket cover together define a pocket cavity, and wherein the pocket cover defines an opening providing access to the pocket cavity.

Example 4. The tray table of any of the preceding or subsequent examples or combination of examples, further comprising: a first side extending between the first surface and the second surface; a second side opposite from the first side and extending between the first surface and the second surface, wherein, in a deployed position, the first side and the second side extend in a forward and aft direction; and a table support configured to pivotably support the tray table on a seat back, wherein the table support is connected to the tray table between the first side and the second side.

Example 5. The tray table of any of the preceding or subsequent examples or combination of examples, further comprising a control panel embedded in the second surface and comprising a user interface, wherein the control panel is configured to control at least one piece of cabin equipment associated with a passenger seat comprising the tray table.

Example 6. The tray table of any of the preceding or subsequent examples or combination of examples, wherein the pocket is a first pocket and the pocket surface is a first pocket surface, wherein the tray table further comprises a second pocket defined in the second surface and comprising a second pocket surface that is recessed relative to the second surface, and wherein the control panel is between the first pocket and the second pocket.

Example 7. The tray table of any of the preceding or subsequent examples or combination of examples, wherein the tray table is configured to move between a stowed position and a deployed position relative to a seat back, and wherein, in the deployed position, the second surface is downward facing and the first surface is upward facing.

Example 8. A tray table for a passenger seat, the tray table comprising: a first surface; a second surface opposite from the first surface; and a control panel embedded in the second surface and comprising a user interface, wherein the control panel is configured to control at least one piece of cabin equipment associated with a passenger seat comprising the tray table.

Example 9. The tray table of any of the preceding or subsequent examples or combination of examples, further comprising a pocket defined in the second surface, wherein the pocket comprises a pocket surface, and wherein the pocket surface is recessed in the tray table relative to the second surface.

Example 10. The tray table of any of the preceding or subsequent examples or combination of examples, wherein the pocket is a first pocket and the pocket surface is a first pocket surface, wherein the tray table further comprises a second pocket defined in the second surface and comprising a second pocket surface that is recessed relative to the second surface, and wherein the control panel is between the first pocket and the second pocket.

Example 11. The tray table of any of the preceding or subsequent examples or combination of examples, wherein the control panel comprises a touch screen.

Example 12. The tray table of any of the preceding or subsequent examples or combination of examples, wherein the at least one piece of cabin equipment comprises at least one of a cabin light associated with the tray table or an air vent associated with the tray table.

Example 13. The tray table of any of the preceding or subsequent examples or combination of examples, further comprising: a first side extending between the first surface and the second surface; a second side opposite from the first side and extending between the first surface and the second surface, wherein, in a deployed position, the first side and the second side extend in a forward and aft direction; and a table support configured to pivotably support the tray table on a seat back, wherein the table support is connected to the tray table between the first side and the second side, wherein the tray table is configured to move between a stowed position and a deployed position relative to the seat back, and wherein, in the deployed position, the second surface is downward-facing and the first surface is upward-facing.

Example 14. A tray table for a passenger seat comprising: a first side; a second side opposite from the first side; and a table support configured to pivotably support the tray table on a seat back of a passenger seat comprising the tray table, wherein the table support is connected to the tray table between the first side and the second side.

Example 15. The tray table of any of the preceding or subsequent examples or combination of examples, wherein the tray table is configured to support the tray table such that the tray table is slidable relative to the seat back.

Example 16. The tray table of any of the preceding or subsequent examples or combination of examples, further comprising: a first surface extending between the first side and the second side; a second surface opposite from the first surface and extending between the first side and the second side, wherein, in a deployed position, the second surface is downward-facing and the first surface is upward-facing; and a pocket defined in the second surface and comprising a pocket surface, wherein the pocket surface is recessed in the tray table relative to the second surface.

Example 17. The tray table of any of the preceding or subsequent examples or combination of examples, wherein the pocket is a first pocket and the pocket surface is a first pocket surface, wherein the tray table further comprises: a second pocket defined in the second surface and comprising a second pocket surface that is recessed relative to the second surface; and a control panel embedded in the second surface and comprising a user interface, wherein the control panel is between the first pocket and the second pocket.

Example 18. The tray table of any of the preceding or subsequent examples or combination of examples, further comprising: a first surface extending between the first side and the second side; a second surface opposite from the first surface and extending between the first side and the second side; and an aft side extending between the first side and the second side and between the first surface and the second surface, wherein the table support is connected to the aft side of the tray table.

Example 19. The tray table of any of the preceding or subsequent examples or combination of examples, further comprising a central axis between the first side and the second side, wherein, in a deployed position, the central axis extends in a forward and aft direction, and wherein the table support is aligned with the central axis.

Example 20. The tray table of any of the preceding or subsequent examples or combination of examples, wherein the tray table is configured to move between a stowed position and a deployed position relative to the seat back, and wherein, in the deployed position, the first side and the second side extend in a forward and aft direction.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table for a passenger seat, the tray table comprising:
    a first surface;
    a second surface opposite from the first surface, wherein the tray table is movable between a stowed configuration and a deployed configuration, and wherein, in the stowed configuration, the second surface is an aft-facing surface;
    a control panel embedded in the second surface and comprising a user interface; and
    a pocket defined in the second surface and comprising a pocket surface,
    wherein the pocket surface is recessed in the tray table relative to the second surface.

2. The tray table of claim 1, wherein a distance between the pocket surface and the first surface is less than a distance between the second surface and the first surface.

3. The tray table of claim 1, wherein the pocket further comprises a pocket cover extending over the pocket surface, wherein the pocket surface and the pocket cover together define a pocket cavity, and wherein the pocket cover defines an opening providing access to the pocket cavity.

4. The tray table of claim 1, further comprising:
    a first side extending between the first surface and the second surface;
    a second side opposite from the first side and extending between the first surface and the second surface, wherein, in a deployed position, the first side and the second side extend in a forward and aft direction; and
    a table support configured to pivotably support the tray table on a seat back, wherein the table support is connected to the tray table between the first side and the second side.

5. The tray table of claim 1, wherein the control panel is configured to control at least one piece of cabin equipment associated with a passenger seat comprising the tray table.

6. The tray table of claim 5, wherein the pocket is a first pocket and the pocket surface is a first pocket surface, wherein the tray table further comprises a second pocket defined in the second surface and comprising a second pocket surface that is recessed relative to the second surface, and wherein the control panel is between the first pocket and the second pocket.

7. The tray table of claim 1, wherein the tray table is configured to move between a stowed position and a deployed position relative to a seat back, and wherein, in the deployed position, the second surface is downward facing and the first surface is upward facing.

8. A tray table for a passenger seat, the tray table comprising:
    a first surface;
    a second surface opposite from the first surface; and
    a control panel embedded in the second surface and comprising a user interface,
    wherein the control panel is configured to control at least one piece of cabin equipment associated with a passenger seat comprising the tray table.

9. The tray table of claim 8, further comprising a pocket defined in the second surface, wherein the pocket comprises a pocket surface, and wherein the pocket surface is recessed in the tray table relative to the second surface.

10. The tray table of claim 9, wherein the pocket is a first pocket and the pocket surface is a first pocket surface, wherein the tray table further comprises a second pocket defined in the second surface and comprising a second pocket surface that is recessed relative to the second surface, and wherein the control panel is between the first pocket and the second pocket.

11. The tray table of claim 8, wherein the control panel comprises a touch screen.

12. The tray table of claim 8, wherein the at least one piece of cabin equipment comprises at least one of a cabin light associated with the tray table or an air vent associated with the tray table.

13. The tray table of claim 8, further comprising:
    a first side extending between the first surface and the second surface;
    a second side opposite from the first side and extending between the first surface and the second surface, wherein, in a deployed position, the first side and the second side extend in a forward and aft direction; and
    a table support configured to pivotably support the tray table on a seat back, wherein the table support is connected to the tray table between the first side and the second side, wherein the tray table is configured to move between a stowed position and a deployed position relative to the seat back, and wherein, in the deployed position, the second surface is downward facing and the first surface is upward facing.

14. A tray table for a passenger seat comprising:
a first side;
a second side opposite from the first side;
a control panel embedded in a surface between the first side and the second side and comprising a user interface; and
a table support configured to pivotably support the tray table on a seat back of a passenger seat comprising the tray table,
wherein the table support is connected to the tray table between the first side and the second side.

15. The tray table of claim 14, wherein the tray table is configured to support the tray table such that the tray table is slidable relative to the seat back.

16. The tray table of claim 14, further comprising:
a second surface extending between the first side and the second side;
the surface opposite from the first surface and extending between the first side and the second side, wherein, in a deployed position, the surface is downward-facing and the second surface is upward-facing; and
a pocket defined in the surface and comprising a pocket surface, wherein the pocket surface is recessed in the tray table relative to the surface.

17. The tray table of claim 16, wherein the pocket is a first pocket and the pocket surface is a first pocket surface, wherein the tray table further comprises:
a second pocket defined in the surface and comprising a second pocket surface that is recessed relative to the surface,
wherein the control panel is between the first pocket and the second pocket.

18. The tray table of claim 14, further comprising:
a second surface extending between the first side and the second side;
the surface opposite from the second surface and extending between the first side and the second side; and
an aft side extending between the first side and the second side and between the second surface and the surface, wherein the table support is connected to the aft side of the tray table.

19. The tray table of claim 14, further comprising a central axis between the first side and the second side, wherein, in a deployed position, the central axis extends in a forward and aft direction, and wherein the table support is aligned with the central axis.

20. The tray table of claim 14, wherein the tray table is configured to move between a stowed position and a deployed position relative to the seat back, and wherein, in the deployed position, the first side and the second side extend in a forward and aft direction.

* * * * *